United States Patent Office

2,877,277
Patented Mar. 10, 1959

2,877,277

PRODUCTION OF VINYL CHLORIDE FROM ETHYLENE DICHLORIDE

David C. G. Gattiker, Shou Chu Liang, and Johann G. D. Schulz, Montreal, Quebec, Canada, assignors to Dominion Tar & Chemical Company Limited, Montreal, Quebec, Canada, a company of Canada No Drawing. Application May 26, 1955
Serial No. 511,428

5 Claims. (Cl. 260—656)

The present invention relates to the manufacture of vinyl chloride. It is concerned, more particularly, with a process for dehydrochlorinating ethylene dichloride by means of a chemical agent to produce vinyl chloride of high purity.

It is well known that vinyl chloride can be produced from ethylene dichloride by thermal or thermo-catalytic methods, all of which essentially involve subjecting the dichloride to temperatures sufficiently high to effect the removal of a hydrogen chloride molecule from the molecule of ethylene dichloride. In practice, the handling at very high temperatures of gases including a proportion of corrosive hydrogen chloride, poses technical problems of considerable difficulty; moreover, the necessity arises of thoroughly purifying and drying the ethylene dichloride feed-stock and, furthermore, of very thoroughly purifying the vinyl chloride, as even traces of hydrogen chloride are objectionable in the final product.

Attention, therefore, has been directed more and more towards effecting the dehydrochlorination with the help of chemical dehydrochlorinating agents, while operating at moderate or moderately high temperatures. Potassium hydroxide and, more frequently, sodium hydroxide have been proposed as dehydrochlorinating agents useful for the preparation of vinyl chloride from ethylene dichloride, particularly when employed in conjunction with a second component, notably a hydroxy organic compound functioning to increase the mutual solubility of the reactants, or, alternatively, when subjected to the influence of elevated temperatures and superatmospheric pressures.

The various industrial applications of this method, however, still suffer from several disadvantages, such as the excessive formation of acetylene in the process of dehydrochlorination and the necessity to handle a highly corrosive aqueous caustic solution; and moreover, the drawback of having a relatively high cost material like sodium hydroxide consumed in the process renders its use uneconomical, except where unusual circumstances prevail.

It has been further proposed, in a general manner, to dehydrochlorinate polychloroethanes using a calcium hydroxide slurry at a reaction temperature maintained below the boiling point of the organic azeotropes formed in the reaction. However, when applied to the preparation of vinyl chloride by dehydrochlorination of ethylene dichloride, this method results in little or no yield of vinyl chloride, even if unusually long reaction periods are allowed.

It is an object of the present invention to avoid the various disadvantages of the prior art methods and, in particular, to provide a method for producing vinyl chloride of high purity from relatively impure ethylene dichloride. Another object is to produce vinyl chloride efficiently by dehydrochlorination of ethylene dichloride using a calcium hydroxide slurry. A further object is to provide an economical process for the production of vinyl chloride.

These objects are achieved by the process of the present invention wherein ethylene dichloride, which may be of unrefined commercial grade and may contain 10% or more of impurities, is mixed with a slurry of an alkaline earth metal hydroxide, preferably calcium hydroxide, such as can be prepared by suspending in water ordinary commercial grade calcium hydroxide, and the mixture thus formed is introduced into a suitable reaction vessel and therein heated to the reaction temperature under pressure, and therein further maintained at said reaction temperature under pressure until a major proportion of the original ethylene dichloride has undergone reaction, whereupon the products of the reaction are withdrawn and separated. By this method a conversion of 85% or more of the ethylene dichloride present is obtainable, with yields of vinyl chloride as high as 90%, based on the ethylene dichloride consumed. Furthemore, the crude vinyl chloride so obtained contains unusually small amounts of the common impurities, notably of acetaldehyde and acetylene, and can be processed into a high grade commercial product by very simple and inexpensive means.

More particularly, in accordance with the present invention, ethylene dichloride which may be of any commercial grade and may contain relatively large amounts of normally obnoxious impurities, such as various chlorinated hydrocarbons, chlorinated ethers, etc., is mixed with a lime slurry which is made by suspending in water calcium hydroxide of ordinary commercial grade containing preferably, but not necessarily, less than 10% calcium carbonate and less than 20% magnesium hydroxide as impurities. The proportions of water to calcium hydroxide in the mixture may vary within wide limits, being preferably in the weight ratio of between 2:1 and 10:1, and more particularly such that on subsequent formation of calcium chloride the concentration of said calcium chloride in the mixture should preferably not exceed 40% by weight. We prefer to have the ethylene dichloride and the calcium hydroxide present at the reaction in substantially stoichiometric proportions, but wide variations in their relative amounts are permissible, and it is actually found desirable to employ a small excess of lime, of the order of 5% to 20%, over and above the amount necessary to react with the ethylene dichloride. The mixing of the ethylene dichloride with the lime slurry may be effected in any suitable manner, either prior to the introduction of the materials into the reaction vessel or in the reaction vessel itself. The reaction vessel is of a type capable of withstanding moderately high pressures, and fitted with means for measuring the temperature and pressure, and with means for withdrawing separately gaseous and liquid products, and with means for heating.

The mixture in the reaction vessel is heated to a temperature above 100° C. but below that at which pyrolytic dehydrochlorination to any substantial extent is beginning to take place, whereupon the pressure in the closed vessel will rise to a value which depends upon the temperature of the mixture, and which value will be within the range of 80 to 250 p. s. i. g. The mixture is maintained at the temperature and under the pressure thus reached for a length of time sufficient to obtain a satisfactory conversion of the ethylene dichloride, which length of time is preferably between one-half and two and one-half hours. It is of importance to note that, while the upper limit of temperature, and of the corresponding pressure, is dictated only by the economics of the process, the lower limit is of a more critical nature, in that only insignificant amounts of vinyl chloride can be collected from a reaction carried out at a temperature below 100° C. even though a long reaction period, of the order of many hours, is allowed.

The reaction products are subsequently withdrawn from the vessel by any suitable means and separated from the unreacted materials. The crude vinyl chloride thus obtained is of very high purity, containing at most one third of one percent of acetaldehyde and 0.15% of acetylene, which low content of impurities can be removed by very simple and inexpensive methods, such as refluxing followed by scrubbing with water, to leave a product having at most 5 p. p. m. of impurities and, as such, meeting the most rigourous specifications imposed on commercial grades of vinyl chloride monomer.

The invention will be fully understood by reference to the following examples which are purely illustrative.

Example 1

A mixture of 720 gm. of commercial ethylene dichloride and a lime slurry consisting of 350 gm. calcium hydroxide and 2.3 liters of water was introduced into an autoclave, to which suitable means for measuring the temperature and pressure, for heating, and for withdrawing gas were attached. The mixture was heated to 194°–200° C. under 200–215 p. s. i. g. pressure for an hour. A product of 220 gm. of vinyl chloride was collected. A by-product in the form of an aqueous solution of 13% calcium chloride and 3.6% ethylene glycol was also obtained. A total of 228 gm. unreacted ethylene dichloride was recovered. Yield of vinyl chloride: 85% of ethylene dichloride consumed. The crude vinyl chloride contained only 0.15% acetylene and 0.3% acetaldehyde as impurities.

Example 2

In the autoclave was introduced a mixture which was the same as in Example 1. The mixture was heated to 165°–180° C. under 160–170 p. s. i. g. pressure for one hour. A product of 286 gm. vinyl chloride was collected. An aqueous solution of 13% calcium chloride and 2% glycol was obtained as the by-product. A total of 180 gm. unreacted ethylene dichloride was recovered. Yield of vinyl chloride: 85% of ethylene dichloride consumed. The crude vinyl chloride contained not more than 0.15% acetylene and 0.3% acetaldehyde as impurities.

Example 3

Into the autoclave was introduced a mixture which was the same as in Example 1. The mixture was heated to 130°–140° C. under 100–120 p. s. i. g. pressure for two and one-half hours. A product of 204 gm. vinyl chloride was collected. An aqueous solution of 10% calcium chloride and 1.2% glycol was obtained as a by-product. A total of 365 gm. unreacted ethylene dichloride was recovered. Yield of vinyl chloride: 90% ethylene dichloride consumed. The crude vinyl chloride was of the same degree of purity as in previous examples.

Example 4

Into the autoclave was introduced a mixture of 800 gm. crude (84%) ethylene dichloride and a lime slurry composed of 300 gm. calcium hydroxide and 2 liters water. The mixture was heated to 150°–170° C. under 160–165 p. s. i. g. pressure for an hour. A total of 210 gm. unreacted ethylene dichloride was recovered. A product of 292 gm. crude vinyl chloride was collected. The crude vinyl chloride contained less than 0.15% acetylene and 0.3% acetaldehyde as impurities.

Although the invention is primarily concerned with the use of a calcium hydroxide slurry for dehydrochlorinating ethylene dichloride, other alkaline earth metal hydroxides, such as barium hydroxide or strontium hydroxide may be used, the result being a vinyl chloride of the same high order of purity. The use of magnesium hydroxide, however, is not contemplated, as this chemical agent, instead of causing a straight dehydrochlorination, leads to the formation of glycol as the primary product, with vinyl chloride resulting in scarcely measurable amounts. Accordingly, the term alkaline earth metal hydroxide as used in the present specification and claims is understood to include the hydroxides of calcium, barium and strontium only.

The invention is of importance in that it provides a method for producing vinyl chloride more economically, inasmuch as it starts from cheap and relatively impure materials and results in a crude product of greater purity than in prior art processes, thereby permitting the simplification of refining operations; while, at the same time, it gives rise to a commercially valuable by-product, calcium chloride.

What we claim is:

1. A process for producing vinyl chloride comprising subjecting ethylene dichloride to a reaction with an aqueous slurry of an alkaline earth metal hydroxide of the group consisting of the hydroxides of calcium, barium and strontium at a temperature above 100° C. but below that at which thermal dehydrochlorination occurs, under pressure of between 80 and 250 p. s. i. g., and separating the products.

2. A process according to claim 1, wherein the alkaline earth metal hydroxide is calcium hydroxide.

3. A process according to claim 1, wherein the ethylene dichloride and the alkaline earth metal hydroxide are present at the reaction in substantially stoichiometric proportions.

4. A process for producing vinyl chloride comprising introducing ethylene dichloride and a calcium hydroxide slurry in substantially stoichiometric proportions into a closed vessel to form a reaction mixture therein, maintaining said mixture under self-generated pressure at a temperature above 100° C. but below that at which thermal dehydrochlorination occurs, and separating from the mixture a vinyl chloride having low content of impurities.

5. A process for producing a vinyl chloride monomer suitable for the manufacture of polymeric materials comprising introducing ethylene dichloride and a calcium hydroxide slurry in substantially stoichiometric proportions into a closed vessel to form a reaction mixture therein, maintaining said mixture under self-generated pressure at a temperature above 100° C. but below that at which thermal dehydrochlorination occurs, separating from the mixture vinyl chloride, and washing with water and distilling said vinyl chloride.

References Cited in the file of this patent

UNITED STATES PATENTS

| | | |
|---|---|---|
| 2,041,814 | Brous | May 26, 1936 |
| 2,369,485 | Nichols | Feb. 13, 1945 |
| 2,539,307 | Koll | Jan. 23, 1951 |

FOREIGN PATENTS

| | | |
|---|---|---|
| 534,733 | Great Britain | Mar. 17, 1941 |

Notice of Adverse Decision in Interference

In Interference No. 91,284 involving Patent No. 2,877,277, D. C. G. Gattiker, S. C. Liang, and J. G. D. Schulz, Production of vinyl chloride from ethylene dichloride, final judgment adverse to the patentees was rendered Nov. 19, 1962, as to claims 1, 2, 3, 4 and 5.

[*Official Gazette January 29, 1963.*]